2 Sheets—Sheet 1.

E. D. MEAD.
SEED AND FERTILIZER SOWER.

No. 176,405. Patented April 18, 1876.

WITNESSES
INVENTOR

2 Sheets—Sheet 2.
E. D. MEAD.
SEED AND FERTILIZER SOWER.
No. 176,405. Patented April 18, 1876.
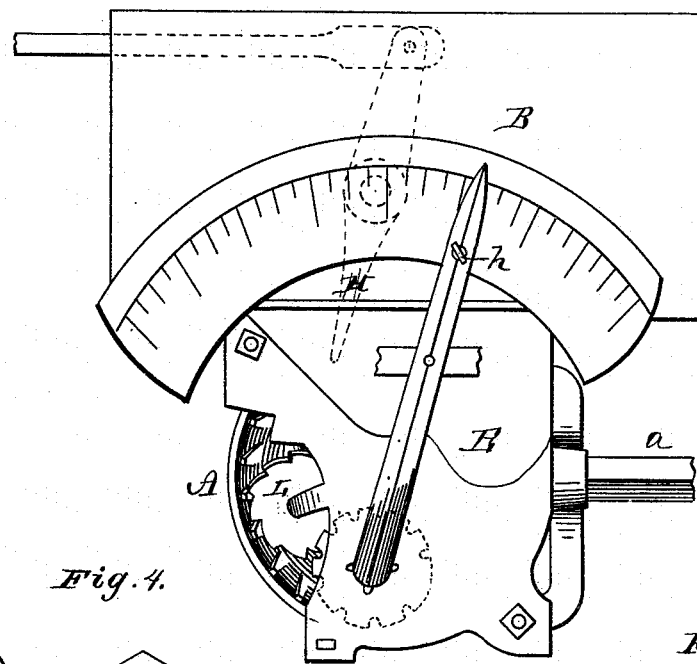
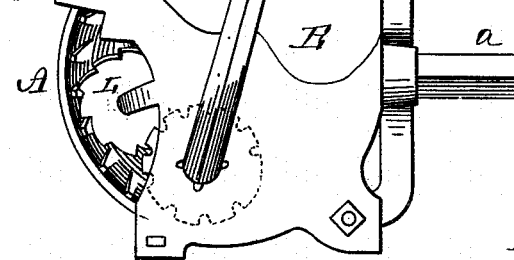
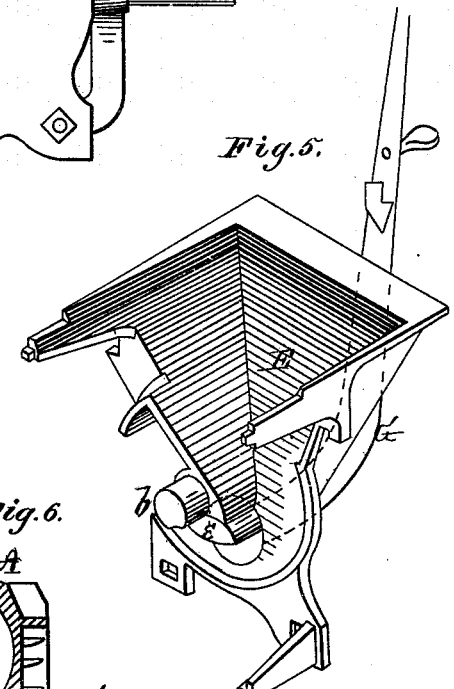
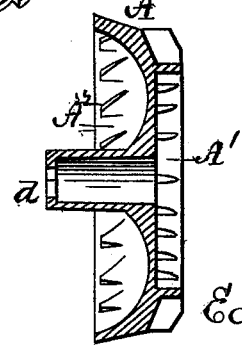
WITNESSES
Henry N. Miller
C. L. Evert
INVENTOR
Edwin D. Mead,
By Alexander H. Mason
Attorneys

UNITED STATES PATENT OFFICE.

EDWIN D. MEAD, OF SHORTSVILLE, NEW YORK.

IMPROVEMENT IN SEED AND FERTILIZER SOWERS.

Specification forming part of Letters Patent No. 176,405, dated April 18, 1876; application filed August 14, 1875.

*To all whom it may concern:*

Be it known that I, EDWIN D. MEAD, of Shortsville, in the county of Ontario and in the State of New York, have invented certain new and useful Improvements in Combined Seed and Fertilizer Sowers; and do hereby declare that the following is a full, clear, and exact description thereof, reference being had to the accompanying drawings, and to the letters of reference marked thereon, making a part of this specification.

The nature of my invention consists in the construction and arrangement of a combined seed and fertilizer sower, as will be hereinafter more fully set forth.

In order to enable others skilled in the art to which my invention appertains to make and use the same, I will now proceed to describe its construction and operation, referring to the annexed drawings, in which—

Figure 1:
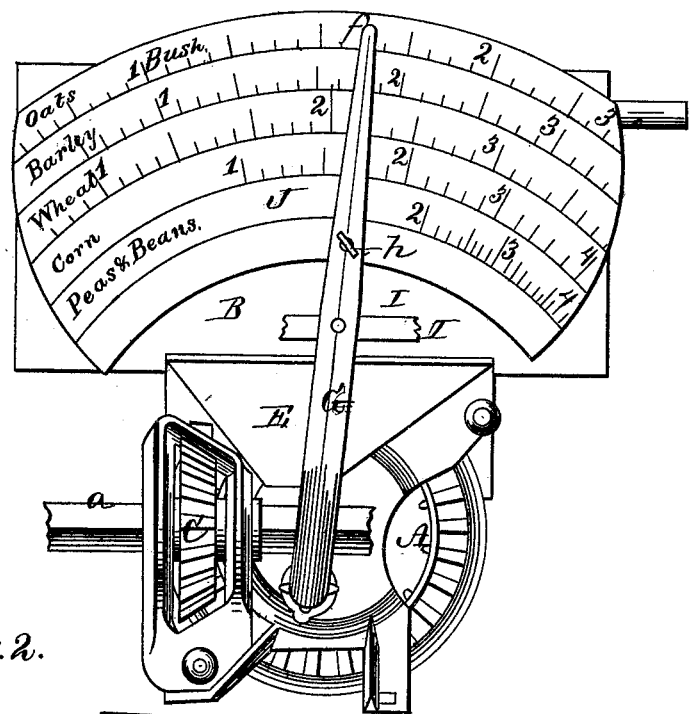
Figure 2:
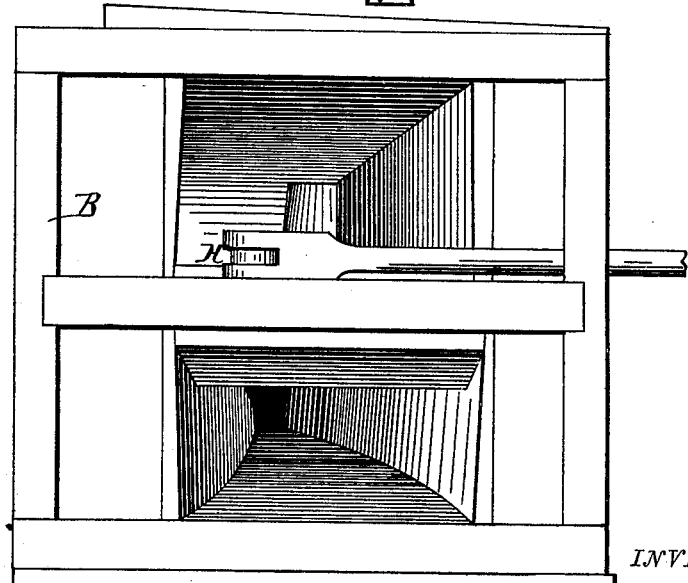

Figure 1 is a side elevation of my invention. Fig. 2 is a plan view of the same. Fig. 3 is a view of the opposite side. Figs. 4, 5, and 6 are detached views of the various parts thereof.

A represents a double feed-wheel, one side for seed and the other side for fertilizer, running lengthwise of the seed-box B, with its two casings or disks. The feed-wheel A is run by cogs formed on its outside periphery, meshing in a pinion, C, having a square center-hole, through which the square shaft $a$ runs, and by it connects with the drive-wheel; or each feed-wheel of a series may be geared together, but the form shown I consider the best. The feed-wheel is formed with a hollow hub, $d$, in which a journal, $b$, is inserted, said hub being formed on and projecting from one side of the surrounding casing, and the same motion is given to the feed-wheel at all times. The cavities in the feed-wheel on each side may be square or concave, as desired. In the wheel shown in the drawing the cavity $A^1$ is for distributing or feeding the seed, and the cavity $A^2$ for feeding the fertilizer. The amount of feed in each part is regulated by means of cut-offs placed abross the discharge-cavities of the distributer. E E represent the common force-feed distributers, constructed to reach each other on the bottom of the seed-box B, so as to do away with the hopper bottom. The discharge-cavity in the distributer is large enough for the largest amount of seed desired to be sown, and the lower part of each distributer forms a disk on the side of the feed-wheel. The cut-off for the seed is a sort of eccentric, $e$, passing through the case or disk on the side of the feed-wheel, across the discharge-cavity, which it increases or diminishes as it is turned. This eccentric cut-off connects directly with an index, $f$, by means of a lever, G. The index-point $f$ moves some distance to give a very little motion to the cut-off $e$, thus making the graduation almost perfect. The levers of each cut-off to a series of distributers are connected by a rod, I, with the index-point. J is the graduated plate attached to one of the seed-boxes, which plate is graduated for each kind of grain separately, which shows the operator at once how far to move the index to sow any desired quantity per acre of any kind of grain. The index is fastened at any point desired by means of a set-screw, $h$.

The advantage of moving each feed-wheel A by a pinion is that the square shaft runs faster than it does when it passes directly through the feed-wheel; therefore takes up its slack quicker on starting, and, connecting with the feed-wheel at its point of highest motion, communicates motion to that immediately, consequently making the space less that is not sowed in starting the drill.

For the fertilizer-sower I use a similar device to the force-feed sower, only the discharge-cavity is made very much larger, and I feed in on the hub of the feed-wheel. To keep the fertilizer from housing I use a stirrer, H, moving slowly backward and forward over the entrance to the discharge-cavity, and may be connected to the drive-wheel by any suitable device.

The cut-off K regulates the amount of discharge of the fertilizer, and is connected with a lever and index in the same manner as the seed cut-off.

To keep the fertilizer from packing and passing out in lumps, or from clogging, I use revolving scrapers L L, arranged at different angles, as shown in Fig. 4, and may be provided with teeth. These scrapers gear with and are revolved by teeth formed in the cavity of the feed-wheel, said scrapers scraping the feed-wheel, and also loosening the fertilizer from the casing.

The advantages of this fertilizer-sower are its combination, in a single distributer, with a seed-sower. The fertilizer is only moved as it is carried out; it saves much of the packing; and it is also adapted to sowing large or small quantities, and such manures as every farmer has himself.

It will be noticed that the cut-offs are sensible to the least movement of the index, and yet the index must move some distance to affect the graduation a very little.

Having thus fully described my invention, what I claim as new, and desire to secure by Letters Patent, is—

1. The combination of the double feed-wheel A, having hollow hub $d$ formed therewith, and the casing E E made in two parts, one of which is provided with the short journals $b$ and the shaft $a$, all substantially as and for the purposes set forth.

2. The combination of the feed-wheel A, constructed with feed-cavities $A^1$ $A^2$ and exterior circle of cogs, the pinion C and square shaft $a$, all as and for the purposes herein set forth.

3. The rotating scrapers L L, in combination with the feed-wheel A and casing E, as and for the purposes herein set forth.

4. The combination, with the series of pivoted cut-offs and crank-levers, of the connecting-bar I and dial-plate, one of the crank-levers being extended to form an index-finger, substantially as described.

In testimony that I claim the foregoing I have hereunto set my hand this 22d day of June, 1875.

EDWIN D. MEAD.

Witnesses:
GEO. H. PRESTON,
W. H. ADAMS.